(12) United States Patent
Perez

(10) Patent No.: US 6,889,122 B2
(45) Date of Patent: *May 3, 2005

(54) LOAD CONTROLLER AND METHOD TO ENHANCE EFFECTIVE CAPACITY OF A PHOTOVOLTAIC POWER SUPPLY USING A DYNAMICALLY DETERMINED EXPECTED PEAK LOADING

(75) Inventor: Richard Perez, Delmar, NY (US)

(73) Assignee: The Research Foundation of State University of New York, Albany, NY (US)

(*) Notice: Subject to any disclaimer, the term of this patent is extended or adjusted under 35 U.S.C. 154(b) by 153 days.

This patent is subject to a terminal disclaimer.

(21) Appl. No.: 10/391,273

(22) Filed: Mar. 18, 2003

(65) Prior Publication Data

US 2003/0182023 A1 Sep. 25, 2003

Related U.S. Application Data

(63) Continuation-in-part of application No. 09/523,682, filed on Mar. 10, 2000, now Pat. No. 6,542,791, which is a continuation-in-part of application No. 09/295,172, filed on Apr. 20, 1999, now Pat. No. 6,037,758.
(60) Provisional application No. 60/083,230, filed on Apr. 27, 1998.

(51) Int. Cl.[7] .............................. G06F 19/00; G05F 1/40
(52) U.S. Cl. ...................... 700/295; 307/66; 323/268; 323/906
(58) Field of Search .............................. 700/295–298; 323/234, 266, 268, 318, 350, 906; 307/64, 66

(56) References Cited

U.S. PATENT DOCUMENTS

| 3,683,343 A | 8/1972 | Feldman et al. ........ 340/870.02 |
| 4,079,591 A | 3/1978 | Derby et al. ................. 60/641.8 |
| 4,341,345 A | 7/1982 | Hammer et al. ........... 236/46 R |

(Continued)

OTHER PUBLICATIONS

R. Perez, "Grid–Connected Photovoltaic Power Storage Requirements to Insure 100% Peak Shaving Reliability", ESQ Meeting May 1, 1997 Washington, DC, pp. 3–8.

(Continued)

*Primary Examiner*—Paul Rodriguez
(74) *Attorney, Agent, or Firm*—Kevin P. Radigan, Esq.; Heslin Rothenberg Farley & Mesiti, P.C.

(57) ABSTRACT

A load controller and method are provided for maximizing effective capacity of a non-controllable, renewable power supply coupled to a variable electrical load also coupled to a conventional power grid. Effective capacity is enhanced by monitoring power output of the renewable supply and loading, and comparing the loading against the power output and a load adjustment threshold determined from an expected peak loading. A value for a load adjustment parameter is calculated by subtracting the renewable supply output and the load adjustment parameter from the current load. This value is then employed to control the variable load in an amount proportional to the value of the load control parameter when the parameter is within a predefined range. By so controlling the load, the effective capacity of the non-controllable, renewable power supply is increased without any attempt at operational feedback control of the renewable supply.

18 Claims, 3 Drawing Sheets

U.S. PATENT DOCUMENTS

| | | | | |
|---|---|---|---|---|
| 4,571,532 | A | 2/1986 | Jaster | 320/101 |
| 4,580,090 | A | 4/1986 | Bailey et al. | 323/303 |
| 4,916,382 | A | 4/1990 | Kent | 323/299 |
| 5,293,447 | A | 3/1994 | Fanney et al. | 392/449 |
| 5,493,155 | A | 2/1996 | Okamoto et al. | 307/45 |
| 5,493,204 | A | 2/1996 | Caldwell | 323/299 |
| 5,500,052 | A | 3/1996 | Horiuchi et al. | 136/244 |
| 5,501,083 | A | 3/1996 | Kim | 62/228.4 |
| 5,514,223 | A | 5/1996 | Vogeli | 136/244 |
| 5,560,218 | A | 10/1996 | Jang | 62/228.4 |
| 5,576,533 | A | 11/1996 | Tantraporn | 250/214 R |
| 5,835,383 | A | 11/1998 | Onizuka et al. | 700/297 |
| 5,878,584 | A | 3/1999 | Sasaki et al. | 62/115 |
| 5,892,354 | A | 4/1999 | Nagao et al. | 323/299 |
| 5,909,061 | A | 6/1999 | Sasaki et al. | 307/44 |
| 6,037,758 | A | 3/2000 | Perez | 323/268 |
| 6,081,104 | A | 6/2000 | Kern | 323/268 |
| 6,310,789 | B1 | 10/2001 | Nebrigic et al. | 363/60 |
| 6,351,400 | B1 | 2/2002 | Lumsden | 363/95 |
| 6,528,977 | B2 * | 3/2003 | Arakawa | 323/282 |
| 6,605,881 | B2 * | 8/2003 | Takehara et al. | 307/86 |

OTHER PUBLICATIONS

R. Perez, et al., "Determination of the End–Use Effective Capacity of Photovoltaics", $14^{th}$ European PV Conference, pp. 1–3.

R. Perez et al., Photovoltaics as a Long–Term Solution to Power Outages Case Study: The Great 1996 ESCC Power Outage, Proc. ASES. '97, pp. 1–6.

R. Perez et al., "Geographical Distribution of Photovoltaic Effective Capacity in the United States", Utility Photovoltaic Group, 1996, 8 pages.

R. Perez et al., "Providing Firm Peak Load Reduction With PVs: Operational Results of the NMPC PV+Buffer Storage Prototype", American Solar Energy Society, 1994, San Jose, California, 5 pages.

R. Perez et al., "Photovoltaics Can Add Capacity to the Utility Grid", Brochure produced for U.S., pp. 1–4.

R. Perez et al., "Assessing the Load Matching Capability of Photovoltaics For US Utilities Based Upon Satellite–Derived Insolation Data", Reprinted from The Conference Record of The Twenty Third IEEE, Photovoltaic Specialists Conference, 1993, Louisville, KY, May 10–14, 1993, pp. 1146–1151.

Perez R., pending U.S. Appl. No. 09/523,682, filed Mar. 10, 2000, entitled "Load Controller and Method to Enhance Effective Capacity of a Photovoltaic Power Supply Using A Dynamically Expected Peak Loading".

* cited by examiner

LOAD CONTROLLER AND METHOD TO ENHANCE EFFECTIVE CAPACITY OF A PHOTOVOLTAIC POWER SUPPLY USING A DYNAMICALLY DETERMINED EXPECTED PEAK LOADING

CROSS-REFERENCE TO RELATED APPLICATION

This application comprises a continuation-in-part patent application of U.S. application Ser. No. 09/523,682, filed Mar. 10, 2000, now U.S. Pat. No. 6,542,791 entitled "Load Controller and Method to Enhance Effective Capacity of A Photovoltaic Power Supply Using A Dynamically Determined Expected Peak Loading", which itself is a continuation-in-part of Ser. No. 09/295,172, filed Apr. 20, 1999, now U.S. Pat. No. 6,037,758, issued Mar. 14, 2000, which claimed the benefit of U.S. provisional application No. 60/083,230, filed Apr. 27, 1998. U.S. application Ser. No. 09/523,682 and U.S. Pat. No. 6,037,758 are hereby incorporated herein by reference in their entirety.

STATEMENT AS TO RIGHTS UNDER FEDERALLY SPONSORED RESEARCH

This invention was made with Government support under NREL Subcontract No. XAD-8-17671-01, Prime Contract No. DE-AC36-98GO10337 awarded by The Department of Energy. Accordingly, the Government has certain rights in this invention.

TECHNICAL FIELD

The present invention relates in general to a control apparatus and method for controlling a variable electric load which is supplied by a conventional power grid and a non-controllable, renewable power supply such as a photovoltaic power source, and more particularly, to a load controller and method which seek to maximize effective capacity of the renewable power source.

BACKGROUND OF THE INVENTION

The practical use of photovoltaic systems, which convert incident sunlight into electrical energy, continues to be of significant interest to the power generation industry. The development of more efficient solar cells, as well as the lower production costs realized by the manufacture of continuously deposited, amorphous solar cells, has made photovoltaic systems more realizable. Photovoltaic modules are being commercially used today to power devices such as radios, to trickle charge batteries in parked cars, and in night illumination systems.

Photovoltaic arrays may be used in a wide variety of additional settings. In general, photovoltaics may be used remotely with specific loads (e.g., signal repeating towers) or with unspecific loads (e.g., off-grid residences, off-grid villages), or connected to a power supply grid. Further, a photovoltaics supply may be connected to a power grid either on the customer-side or on the utility-side of an electric meter, depending upon who owns the system. The present invention is directed principally to applications concerning function-unspecific loads, primarily, but not uniquely in the context of grid-connected systems and on either side of the meter.

High efficiency power conditioning units (PCUs) are commercially available today to ensure that photovoltaic arrays operate near their maximum power point. These PCUs maximize energy transfer from sunlight to usable AC electricity. Under actual conditions, a 1 kW rated array is typically capable of producing anywhere between 1300 and 2500 kWh per year in the United States depending on local climate and array geometry. By contrast, an ideal generator working twenty-four hours per day would produce 8760 kWh per year per rated kW. The ratio between the photovoltaic array output and this ideal output is referred to as capacity factor. Hence, for a photovoltaic array, the capacity factor typically ranges from 15% to 28%. Electrical power plants derive value not only from energy production (their capacity factor) but also from their capacity, that is their contribution to a utility's spinning reserve, hence their ability to deliver power on demand.

Overall, the capacity value of an ideally dispatchable power plant is of the same order as the value of the energy delivered by that plant. Hence, the economics of photovoltaics have traditionally been penalized by the fact that no capacity value is considered for this resource. The present invention is thus directed to capturing additional value for photovoltaics (as well as other non-controllable, renewable resources) by increasing or even maximizing effective capacity of the non-controllable power supply when coupled to a power grid.

DISCLOSURE OF THE INVENTION

Briefly summarized, this invention comprises in one aspect a method for increasing effective capacity of a photovoltaic (PV) power supply coupled to a power grid and a variable load so that the variable load is powered by the power grid and the PV supply. The method includes: determining photovoltaic power supply output and current loading of the variable load, the current loading being determined as a current value of the variable load in the absence of the photovoltaic power supply; determining an expected peak loading (EPL) of the variable load for a defined time interval and ascertaining therefrom a load adjustment threshold; determining a value for a load adjustment parameter from the photovoltaic power supply output, the current loading, and the load adjustment threshold, the load adjustment parameter being defined as the current loading less the photovoltaic power supply output less the load adjustment threshold; and controlling the variable load employing the value of the load adjustment parameter. This controlling of the variable loading is preferably proportional to the value of the load adjustment parameter when the value is within a predefined range. The load adjustment parameter is employed to control the variable load so as to increase the effective capacity of the photovoltaic power supply without any operational feedback control of the PV supply.

In another aspect, a load controller is provided implementing the above-described method. This load controller controls a variable load coupled to a power grid and to a photovoltaic power supply. The load controller includes means for: (i) determining photovoltaic power supply output and current loading of the variable load, the current loading being a current value of the variable load in the absence of the photovoltaic power supply; (ii) determining an expected peak loading (EPL) of the variable load for a defined time interval and ascertaining therefrom a peak adjustment threshold; (iii) determining a value for a load adjustment parameter based on the photovoltaic power supply output, the current loading, and the load adjustment threshold, the load adjustment parameter being defined as the current loading less the PV supply output less the load adjustment threshold; and (iv) controlling the variable load employing the value of the load adjustment parameter. This controlling of the variable load is such as to increase the effective capacity of the photovoltaic power supply.

To restate, the load controller/method of the present invention enhances the economic feasibility of photovoltaic power plants by increasing their "effective capacity" through minimal, selective control of the load. Depending upon the geographical location, a load controller in accordance with this invention can add up to $50–$100 per kilowatt per year to the value of a demand-side photovoltaic power plant. The load controller/method presented enhances the grid penetration potential of a photovoltaic plant and enhances the acceptability of photovoltaics to utility companies. In effect, the present invention proposes selectively reshaping utility load patterns to provide a better match with photovoltaic power output, thereby increasing the ultimate share and reliability of photovoltaics in a utility power generation mix. This invention thus enhances deployment opportunities for the more environmentally benign photovoltaic industry. Additionally, the load controller/method presented herein could be applied with other environmentally benign, non-controllable but renewable resources, such as wind power generation.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
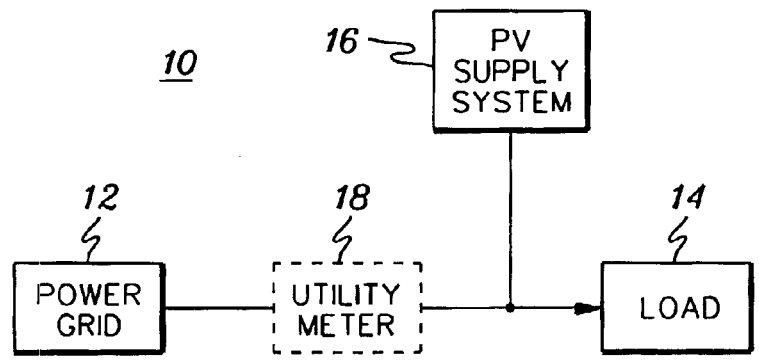
FIG. 1 is a simplified block diagram of a variable electric load supplied by a power grid and a non-controllable, renewable resource such as a photovoltaic (PV) supply system.

Generally stated, "capacity" is a measure of power (kW) that can be "counted on" to meet load requirements. Even though photovoltaic arrays are capable of delivering a reasonable amount of energy, they are traditionally assigned no capacity. This is because photovoltaic output is dependent upon the weather and the cycle of days, and hence cannot be controlled or dispatched to meet load requirements. However, as explained herein, applicant has discovered that the "effective capacity" of a photovoltaic array can be quite high depending on the considered load.

The "effective capacity" of a power plant is the kilowatt (kW) amount by which the power plant may be expected to contribute to the total kilowatt generating capacity available to an electricity provider to meet load requirements. The considered load requirements may be regional (utility), localized (sub-utility) or end-use. In the latter case, when the considered power plant is located on the user-side of the meter, an alternate definition of effective capacity would be: the kilowatt amount by which the power plant may be expected to reduce the user's kilowatt demand. Effective capacity can also be used in relative (percent) terms as the ratio between the kilowatt effective capacity and the rated kilowatt capacity of the power plant.

Both energy and capacity are valuable commodities. On the customer side of an electric meter, large electrical users typically have to pay for both as energy and demand. On the utility side of the meter, capacity is valued against the cost of building new power plants. In addition, when considering dispersed generation such as photovoltaic arrays, locally available capacity is valued against the cost of maintaining and upgrading transmission and distribution power lines, transformers, etc.

One initial challenge facing applicant is to identify quantitative measures of effective capacity that best capture the ability of a non-controllable resource to meet loads. Several benchmarks have been developed and adapted for this purpose. First, an Effective Load Carrying Capability (ELCC) parameter is defined as a primary benchmark. This parameter is a probabilistic measure of available capacity that has traditionally been used by electric utilities to quantify the contribution of new power plants to the total capacity available to that utility under given loss of load probability conditions. The ELCC is a relative measure that can be reported in percent of rated capacity. For instance, a photovoltaic power plant with a rated capacity of 1000 kW and ELCC of 60% could be considered as the equivalent of a 600 kW ideally dispatchable unit.

Note that the geographic regions of highest ELCC do not necessarily overlap with regions of high solar energy resource. For instance, the mid-Atlantic seaboard features some of the highest ELCCs (e.g., 70%) in the United States. This region has not been noted for its high solar resource, however, while Florida with a much higher solar resource only achieves 40–50% ELCC.

Since the ELCC is a probabilistic measure, another benchmark is also needed. This benchmark, referred to as the Minimum Buffer Energy Storage (MBES), is defined as the minimum storage that would give a measure of the ability of a photovoltaic to meet its load requirements under worst case conditions. Essentially, the MBES is the amount of energy reserve that would be necessary in addition to the photovoltaic power plant to ensure that the photovoltaic power plant plus storage system could meet all loads above a given threshold, and hence deliver an effective capacity (ELCC) of 100%.

Through experimentation, applicant has discovered that for PV load penetration levels on the order of 5%, the amount of MBES could be as little as a fraction of a system hour. For instance, for New York's Con Edison at 5% PV load penetration (i.e., 500 MW installed photovoltaics) one-half hour worth of storage (250 MWh) would be enough to register a 100% ELCC (i.e., meeting all loads above 95% of maximum demand). By contrast, the amount of energy reserve to achieve the same capacity without photovoltaics would be five system hours (2500 MWh).

The example above applies to utility-wide (i.e., regional) load requirements. At the regional level, applicant has discovered that effective capacity is well correlated with specific load-shape characteristics (including the time of peak load and the summer-to-winter peak load ratio).

Localized loads have also been investigated, including substations and medium/large end-users. Applicant has discovered that the effective capacity of photovoltaic arrays, as quantified by the ELCC and MBES benchmarks, could be significant at this level as well. The relationship between load characteristics and photovoltaic effective capacity has been found to remain the same for these smaller localized loads. Among end-user types, the effective capacity is believed highest for air-conditioned office buildings and hospitals. The fact that localized and customer-side effective capacity can be controlled and remain significant has important economic implications. This means that, in addition to having utility-wide generating capacity value, a photovoltaic array could also capture a transmission and distribution value (on the utility side), and/or demand reduction value (on the customer side).

More specifically, the MBES benchmark indicates that if a photovoltaic array were operated under favorable conditions (for example, in a commercial office building or metropolitan substation/utility load) it would take only a small amount of energy reserve in addition to a photovoltaic power plant to increase effective capacity of the photovoltaic array to 100%. With demand rates as high as $30 kW for several large metropolitan utilities, this effective capacity increase is significant.

Rather than supplying stored or backup energy to compliment a photovoltaic array when needed to guarantee a high ELCC, the same effect is achieved in accordance with the principles of the present invention by controlling the load energy by an amount equal to the amount that would otherwise be needed to guarantee a desired effective capacity. Based on the MBES values reported above, the necessary load reductions would not have to be very large. Thus, a load controller in accordance with the present invention may act, for example, on the setting of a building energy system (such as cooling, heating or lighting) and/or end-use appliance by slightly modifying the system or appliance operating thresholds and/or operating schedules when needed to maintain effective capacity. It is important to note that the present invention does not seek to maximize the energy transfer from the photovoltaic to the grid. Power conditioning units (PCUs) are already available to perform this function as described above. Further, it is important to note that the present invention employs only an informational link between the photovoltaic array output and the load controller to be implemented.

In accordance with this invention, a load controller and method are proposed which seek to indefinitely control a variable load in a manner that has not heretofore been addressed. A load controller in accordance with this invention is designed to maximize a photovoltaic array's "effective capacity" by selective load control. Prior approaches either maximize energy transfer (for example, reference U.S. Pat. No. 5,560,218) or maximize power tracking (for example, reference U.S. Pat. No. 5,293,447), i.e., the ability of a photovoltaic battery to operate at its optimum point on an I-V curve. In the context of a load controller of the present invention, it is assumed that commercially available power conditioning units already maximize energy transfer from the photovoltaic plant to the AC power grid. The load controller presented herein is only concerned with the "effective capacity" of the photovoltaic array.

Further, load control with a photovoltaic plant is typically directly linked to a specific load (e.g., an air-conditioner). Conventional load control action involves feedback to the photovoltaic power plant's operation because the action taken on the load optimizes energy transfer from the power plant. This is to be contrasted with a load controller as presented herein. Pursuant to this invention, the PV power plant operates totally independently of the load controller. The link to the load controller is informational only. In fact, the photovoltaic plant and the load controller would not need to be co-located. For example, a utility operating a photovoltaic power plant could employ a load controller as presented herein to meet the load requirements of a summer peaking substation. Load control units (e.g., smart thermostats) installed at major customers served by the substation could be used to maximize the photovoltaic plant's effective capacity, and hence its support to the substation and the downstream distribution line, without any feedback on the operation of the photovoltaic power plant.

FIG. 1 depicts one embodiment of an electrical system 10 wherein a power grid 12 supplies power to a variable load 14 and a photovoltaic (PV) supply system 16 supplements power grid 12. A utility meter 18 (shown in phantom) is typically disposed between power grid 12 and the variable load 14. When disposed as shown in FIG. 1, the PV supply system 16 is connected on the customer-side of the meter. Alternatively, system 16 could be located on the utility-side of the meter depending upon who owns the photovoltaic system.

Figure 2:
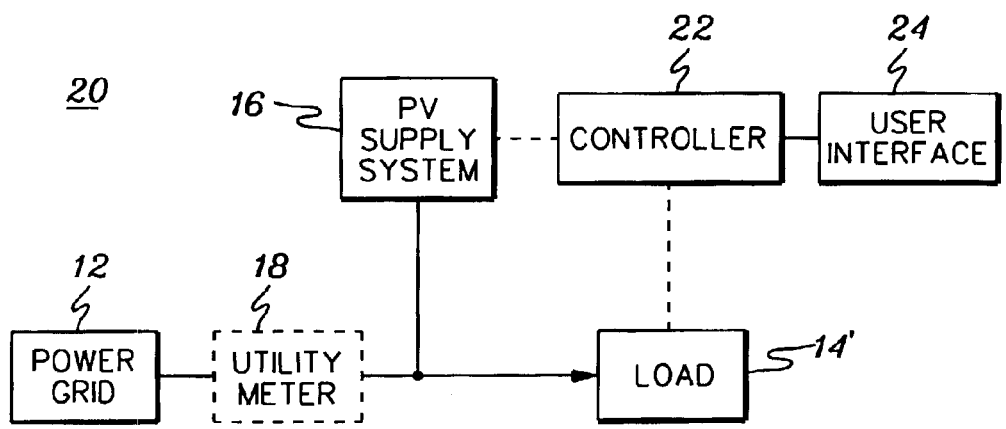
FIG. 2 is a block diagram of a load controller in accordance with the present invention shown with the system of FIG. 1.

FIG. 2 depicts one embodiment of a system 20 in accordance with the present invention wherein a load controller 22 is coupled to PV supply system 16 and variable load 14' for monitoring PV supply system 16 and load 14', and for controlling variable load 14' in order to increase or maximize "effective capacity" of the PV supply system 16. As noted, this is achieved without any feedback control of the PV supply system itself. If desired, a user interface 24 can be coupled to load controller 22 for facilitating user modification of one or more parameters (discussed below) employed in the control algorithm implemented by load controller 22.

Figure 3:
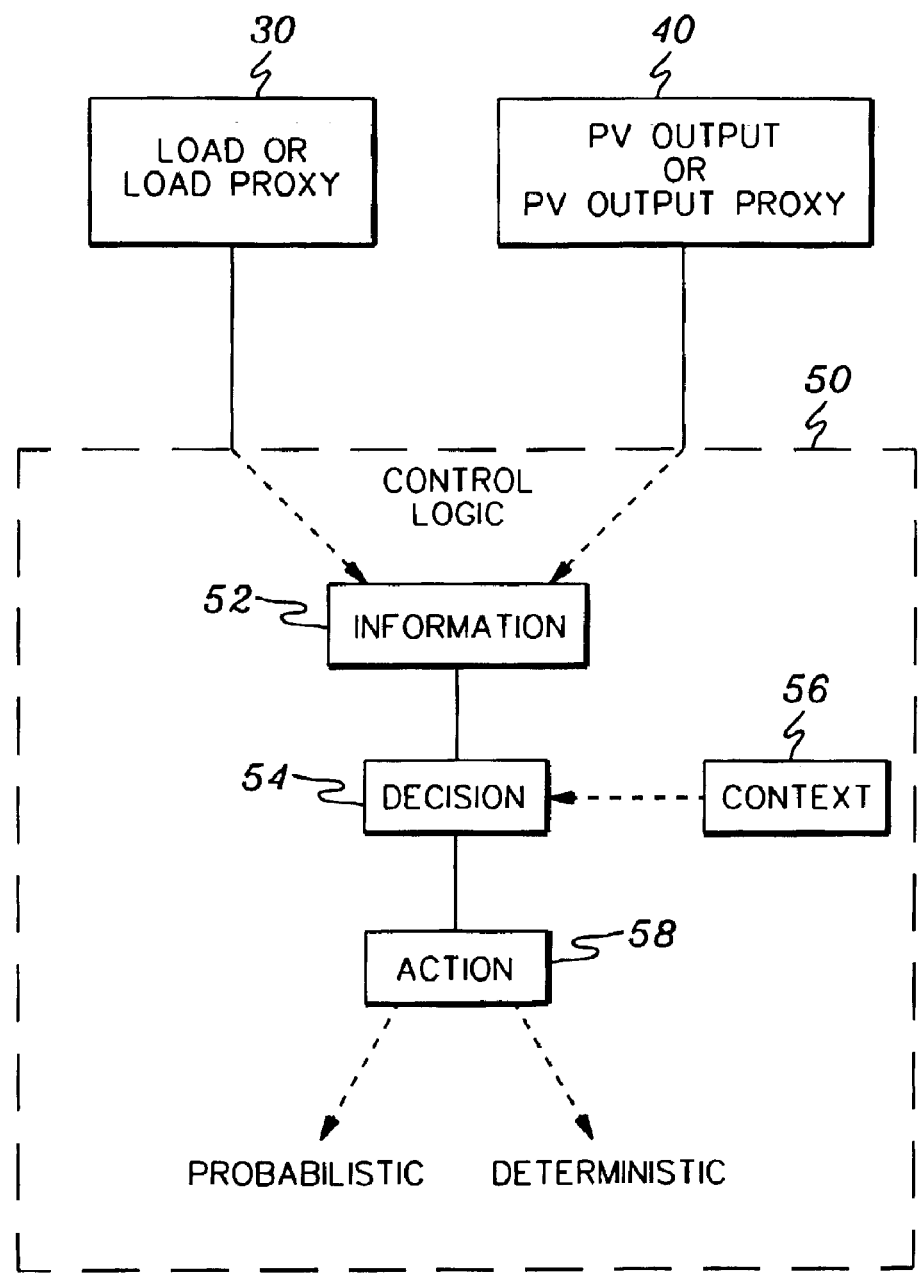
FIG. 3 is a flowchart of one embodiment of processing to be implemented by the load controller of FIG. 2.

A high level diagram of one embodiment of the control logic implemented by controller 22 is depicted in FIG. 3. The logical nodes of control logic 50 are information 52, decision 54 and action 58. Information 52 gathers/comprises the input required to operate the controller's logic. This input consists of, for example, real-time output of the photovoltaic power plant 40 and the real-time electrical load 30. Alternatively, the information may consist of proxies for the photovoltaic array output and the current load. For example, photovoltaic output proxies may include solar radiation information, cloud cover images sensed by weather satellites, etc., while load information proxies may comprise ambient temperature (which may be highly correlated with air-conditioning loads), time-of-day, time-of-week, and/or day-of-year information, etc. Note also that in a utility-side context, the relevant photovoltaic output may consist of the combined output of several disbursed photovoltaic plants affecting the considered load.

Figure 4:
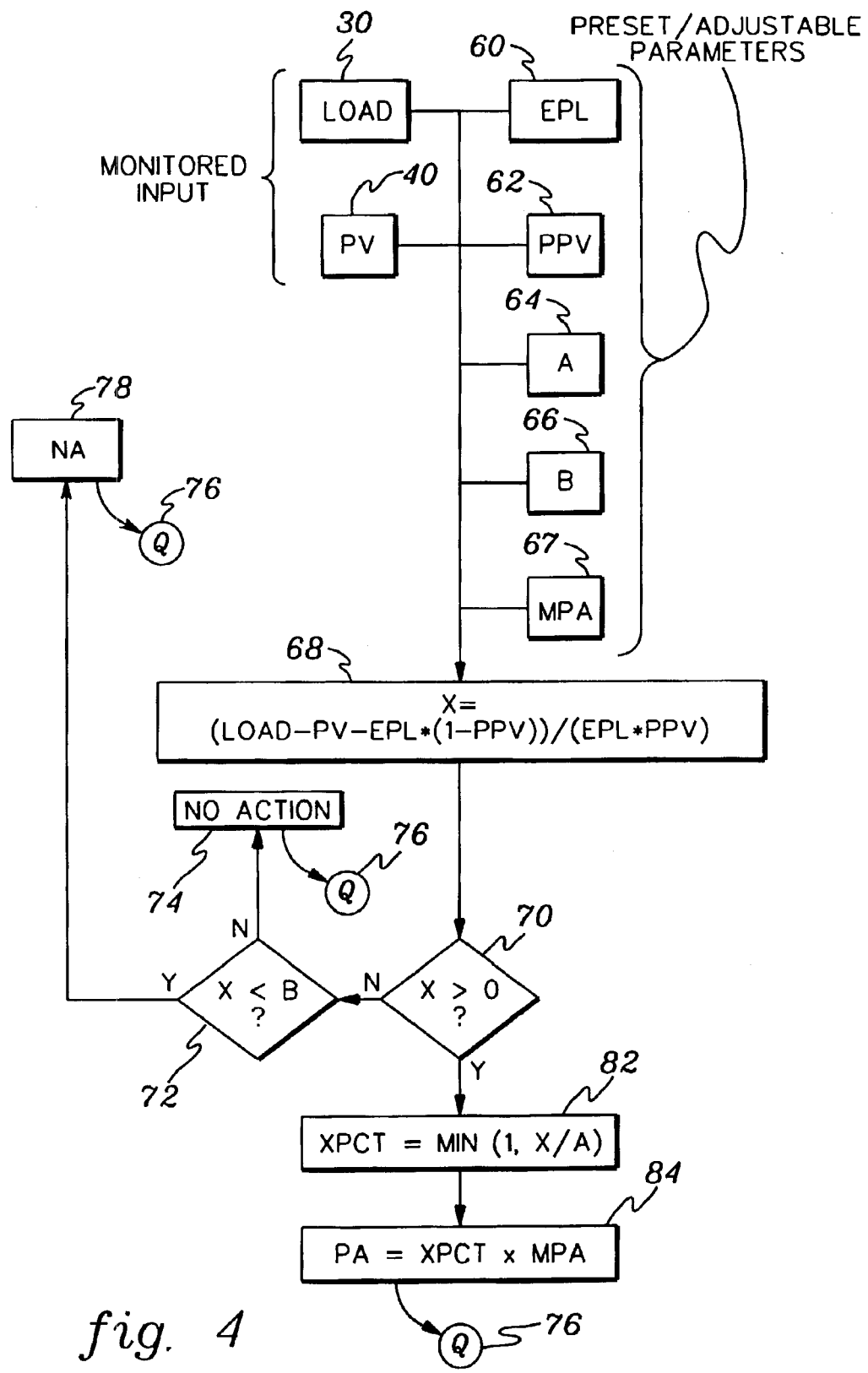
FIG. 4 is a more detailed embodiment of the control logic processing of FIG. 3 in accordance with the principles of the present invention.

The photovoltaic and load information is fed to the controller logic, for example, through dedicated signal wiring, wireless signal transmission, or power wires. The decision 54, which is described below with reference to FIG. 4, is made with reference to a contextual setting 56. The context indicates whether the load controller is used in a demand-side or a utility-side mode. In a demand-side context, the load controller is operated to maximize photovoltaic effective capacity with respect to the customer's electrical load, while in a utility-side context, the load controller is operated to maximize photovoltaic effective capacity with respect to loads upstream from the customer, for example, a local feeder, local substation load, or a utility-wide load.

Depending on the context and type of load controller application, decision 54 could be co-located with the action 58 or not. For instance, in a utility-side context, the decision could be made by a central utility-operated logical unit, sending signals to localized action devices. The load controller can operate with either a deterministic or a probabilistic approach. In a deterministic approach, the action might be an adjustment of a selected operating threshold. Positive action is the action of adjusting the operating threshold, preferably up to a maximum user-selected amount (maximum positive action (MPA)) in the sense of load reduction (e.g., raising operating temperature of an air-conditioned building). As explained further below, negative action may also be employed which could consist of a slight threshold adjustment tending to increase the load, or no action might be taken on the load depending upon the results of the decision logic.

In a probabilistic approach, take "negative action" (NA) might signify no pause or delay in the operation/startup of a given load component, such as an appliance or system. Maximum positive action (MPA) signifies enforcing a maximum delay/pause length on all considered appliances or components of the load. Further, in accordance with this invention, positive action (PA) is preferably prorated to the value of a load control parameter between zero and A. This would imply enforcing partial delay on all considered load components and/or more likely, enforcing a preset delay on a prorated fraction of the considered appliances or load components. Additionally, those skilled in the art will note that a probabilistic action may also comprise a threshold adjustment as described above in connection with a deterministic action.

The choice/effectiveness of the control strategy depends on the context of the load controller application. For a user-owned demand-side photovoltaic system, a deterministic strategy might be preferable (unless the user is very large with many diversified loads) because the effective capacity of the photovoltaic array, valued against the user's demand, could have a direct impact on the local load. Both strategies would be effective in the context of a utility-owned or operated system because the impact on effective capacity would not need to be highly localized.

FIG. 4 depicts one example of decision logic in accordance with the present invention. The decision per se is a decision whether to take action and if so, the type and magnitude of the action. The decision is implemented automatically and is preferably repetitively re-evaluated at a predefined interval of time (e.g., every 2–5 minutes). This embodiment of the decision logic employs seven input parameters or variables. First, the real-time loading (or an approximation thereof) 30 as well as the real-time photovoltaic array output (or an approximation thereof) 40 are obtained. Note that the current load used as input is the load unaffected by the controller (i.e., if measured, the load should be adjusted to reflect the action taken by the controller). In addition, the decision logic receives certain predefined, user-adjustable values. These values include the expected peak loading (EPL) 60 and the percentage of photovoltaic penetration (PPV) 62, as well as two constants, A 64 and B 66, and a programmable maximum possible action (MPA) 67.

The EPL is assumed valid for a defined period of time, and can be based on historical data, forecasts or even dynamically calculated as explained further below. The PPV is a ratio of the size of the photovoltaic generator (or ensemble of considered generators) to the considered peak load. It is important to note that the PPV could be a fraction or a multiple of the size of the PV generator which is significant with respect to a probabilistic load controller operation. Constant A is a multiplier to the size of the photovoltaic generator, adjusting the load control threshold for maximum action, while constant B is a multiplier to the size of the photovoltaic generator and is used to decide between no action and negative action (described below).

Assuming that the above-described inputs are available, decision logic in accordance with the present invention determines a load adjustment parameter X as follows:

$$X = (LOAD - PV - EPL \cdot (1 - PPV))/(EPL \cdot PPV)$$

where:
LOAD=current load (known or determined from proxy). The term may refer to either the current reading of a considered load on a preset data sampling time step (e.g. every minute), or to an average of this value representative of a demand-sampling interval (e.g., 15 minutes is the prevailing interval for most utilities in the United States). In addition, this term should reflect the load of the building as it would be measured without photovoltaic (PV) or load control action. Therefore, LOAD should be equal to the measured building load(LD)+PV+XPCT·EPL–PPV, if the PV is on the customer side of the meter, and equal to building load(LD)+XPCT·EPL–PPV, otherwise;
PV=current measured PV output (known or determined from proxy) corresponding to the considered context;
XPCT·EPL·PPV=SLCLD=estimated load adjustment (e.g., curtailment) due to the solar load controller (of the present invention).
EPL=expected peak load (depending on context, this may be a seasonal or daily forecast, or an estimated yearly or seasonal value based on historical end-use bills). For most applications, EPL is adjusted dynamically from an initial estimate $EPL_0$ set at the beginning of a defined time interval, such as a billing cycle. Initial estimates are user-set and may vary at the beginning of each defined interval. One methodology to dynamically adjust EPL within a defined interval from initial value estimates for EPL and PPV, i.e., $EPL_0$ and $PPV_0$, respectively, would be as follows:

---
Set $EPL = EPL_0$
If LOAD > EPL then
    EPL=LOAD
    $PPV = PPV_0 \cdot EPL_0/EPL$
Else
    No Change;

---

PPV=percentage of PV penetration determined by the ratio of the installed PV capacity and the peak of the considered load (depending on the load control strategy and context, parameter PPV could also be an arbitrary portion of the PV generator.) When EPL is adjusted dynamically as explained above, PPV should be adjusted as well from an initial value $PPV_0$, so that it always represents the ratio of installed PV capacity to EPL or any set multiple thereof. This action would be as specified under the definition for EPL provided above.

In addition, because many applications are designed to reduce utility demand bills, and because demand is typically measured on a 15 minute average basis, many of the above-defined parameters, including the measured building load (LD), the current measured photovoltaic output (PV), and the estimated load adjustment due to the solar load controller (SLCLD) can be 15 minute rolling averages.

To restate, described herein is a technique for minimizing user discomfort while maximizing photovoltaic effective capacity. For example, in accordance with the algorithm described above, preset or user adjustable values of EPL and PPV, referred to herein as $EPL_0$ and $PPV_0$, respectively, comprise preset values representative of an estimated guess of a buildings peak load during a given defined interval, such as a billing cycle. These preset values may vary from billing cycle to billing cycle. For example, the values could be stored in memory as user adjustable arrays of 12 month values. At the beginning of each demand billing cycle (i.e., a month or a year depending on utility tariffs), EPL and PPV are set to $EPL_0$ and $PPV_0$, respectively. As monitored input, LOAD and PV, become available, the controller can take action to fine tune EPL, i.e., both EPL and PPV can be adjusted as a function of the actual monitored LOAD whenever the actual LOAD exceeds the EPL. By this action, the algorithm proposed herein evolves with the building and seeks to minimize the impact of the load controller on the user. A goal is to maintain a demand reduction commensurate with the site of the PV system irrespective of the peak load for a given interval.

Note that in effect the quantity EPL·(1−PPV) constitutes a decision threshold against which to gauge current load and PV output conditions. Upon calculating the load adjustment parameter X 68, the decision logic inquires whether the value of parameter X is greater than 0 70. If parameter X is negative, meaning that the loading is less than the photovoltaic output plus the load adjustment threshold as defined above, then (optionally) processing determines whether the load adjustment parameter X is less than a predefined constant B, which itself comprises a negative number 72. If parameter X is not less than constant B then no action 74 is taken and the decision logic returns Q 76 by an appropriate link to the action center (for example, a thermostat). However, if parameter X is less than the predefined constant B, processing is (optionally) directed to take "negative action" (NA) 78. If the action is deterministic, a negative action might be a preset adjustment of the considered operating threshold in the sense of a load increase (for example, lowering operating temperature of an air-conditioned building). If action is probabilistic, then negative action might signify no pause or delay in the operation/startup of the considered load component. After deciding to take negative action, processing proceeds to the action center via an appropriate link Q 76.

Returning to inquiry 70, if the load adjustment parameter X is a positive number, then the decision logic next determines a value for variable XPCT 82. XPCT is a factor between zero and one which essentially prorates the positive action to be taken relative to a maximum possible action (MPA), i.e., XPCT is defined as min(1, X/A). After determining XPCT, processing determines a positive action (PA) to be taken 84. In this example, positive action (PA) is a load controller determined fraction of the maximum positive action up to the maximum positive action. Thus, the load action taken in accordance with this invention will be prorated in many instances relative to the maximum positive action predefined for the load controller. Once the positive action (PA) is determined, processing is passed to the action center Q 76 for implementation of a deterministic or probabilistic action as described above.

By way of example, one of ordinary skill in the art will understand that the present invention can be implemented employing a "smart thermostat". The smart thermostat is a conventional thermostat that would have the capability of receiving logic-driven signals and adjusting user-set temperature upwards or downwards, depending on the logic's decisions. The example presented below assumes a demand-side photovoltaic system.

In one example, the LOAD and PV output could either be measured or estimated from proxies (e.g., outdoor temperature, time of day and/or a photometer installed on the end-user's premises). A logic unit, installed in a central location (e.g., near an HVAC center, or near the PV power conditioning unit) would interpret this information, determine the value of X, and send a series of pre-determined signals to the room thermostat. These signals would correspond to amounts by which to increase or reduce user-selected temperatures. Action orders would be sent to the thermostats via thermostatic wire or any other appropriate means. In the case of decentralized HVAC units (e.g., room HVAC units used in many hotels), action orders could be sent through power wire to the HVAC units, and appropriately relayed through thermostatic wires. The EPL parameter used in this example could simply be a conservative fraction of the expected building peak load based on simulation or historical demand bills. The PPV parameter would be the ratio of installed PV capacity to the expected building peak load or a fraction/multiple thereof.

As another example, one of ordinary skill in the art will understand that the present invention could be implemented as a smart light controller. In this case, the maximum possible action (MPA) would refer to the maximum acceptable level of light dimming. The algorithm would, as described above, determine the parameter X and apply appropriate dimming as a fraction of a preset MPA.

As still another example, one of ordinary skill in the art will understand that the present invention could be implemented as an air conditioning controller. In this case, the maximum possible action (MPA) would refer to the maximum acceptable level of temperature change, e.g., of temperature increase. The algorithm would, as described above, determine the parameter X and apply appropriate temperature changes as a fraction of a preset MPA.

For those instances where MPA is not explicitly defined in terms of power (KW), and in particular, for a temperature cooling example, a parameter KWD can be employed. This parameter, which is a user-selectable input to the solar load control algorithm, represents the expected amount of kilowatt load reduction resulting from one degree of cooling temperature increase for the variable load. This parameter may be estimated for a particular building based upon (a) past bills, and/or (b) building load data, and/or (c) building and HVAC specifications. When the MPA is defined in temperature degrees, the estimated load curtailment resulting from action of the solar load controller (SLCLD) equals PA·KWD, where PA is a temperature adjustment request, i.e., the current PA is parameter X.

As a further consideration, it has been observed that a building's response to thermostatic temperature increase is not instantaneous, but rather can take several minutes. In view of this, two additional parameters are defined, i.e., $SLCLD_{long}$ and $SLCLD_{short}$. $SLCLD_{long}$ is defined as a running mean average of PA·KWD over N minutes, where N is a user estimated amount of time necessary for a thermostatic temperature adjustment to have a full impact on the load. $SLCLD_{short}$ is defined as a running mean average of PA·KWD over M minutes, where M is a user defined shorter time interval than N. For example, M may equal 2 minutes, while N may be 30 minutes. Further, two distinct load parameters are defined, LOAD and LOAD', as:

$$LOAD = LD + PV + \text{Min}(SLCLD_{short}, SLCLD_{long})$$

$$LOAD' = LD + PV + \text{Max}(SLCLD_{short}, SLCLD_{long})$$

where:

LOAD=a parameter used to update a value for the expected peak loading (EPL), discussed above;

LOAD'=a parameter used to calculate the parameter X (i.e., $PA_{now}$);
LD=measured value of the variable load;
PV=measured photovoltaic power supply output;
$SLCLD_{short}$=running mean average of PA·KWD over N minutes;
$SLCLD_{long}$=running mean average of PA·KWD over M minutes, where M<N.

In order to avoid rapid cycling of HVAC equipment using a solar load controller as described herein, a degree of inertia can be introduced into the temperature adjustment request (PA). In cases where the current request calculated from the parameter X ($PA_{now}$) is smaller than the previous request ($PA_{old}$), the following rule can apply:

$$PA = Max(PA_{now}, PA_{old} - MPA/q)$$

where q is a user-selected parameter. For example q may equal 10.

As a further consideration, a request for indoor temperature increase (PA) during the cooling season should result in a drop in cooling load. However, some building HVAC control systems put occupant comfort as a priority and a request for temperature increase may in certain systems result in the addition of heat (e.g., from a furnace) into the occupied space. This obviously could mitigate or eliminate any benefit from a solar load controller as described herein. Therefore, any call for heat should be intercepted by any appropriate means any time a request for thermostatic temperature increase is generated by a solar load controller such as described herein used when cooling a building.

Those skilled in the art will note from the above description, that a load controller/method in accordance with the present invention enhances the economic feasibility of non-controllable power plants by controllably increasing their "effective capacity" through selective control of the load. Depending upon the geographical location, a load controller in accordance with this invention can add up to $50–$100 per kilowatt per year to the value of a demand-side photovoltaic power plant. The load controller/method enhances the grid penetration potential of a photovoltaic plant and enhances the acceptability of photovoltaics to utility companies. In effect, the present invention proposes selectively and dynamically reshaping utility load patterns over an indefinite period of time to provide a better match with photovoltaic power output, thereby increasing the ultimate share and reliability of photovoltaics in a utility power generation mix. The present invention thus enhances deployment opportunities for the more environmentally benign photovoltaic industry. Additionally, the load controller/method presented herein could be applied with other environmentally benign, non-controllable but renewable resources, such as wind power generation.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for increasing effective capacity of a photovoltaic power supply coupled to a power grid and a variable load, said variable load being powered by said power grid and said photovoltaic power supply, said method comprising:
   (a) determining photovoltaic power supply output and current loading of said variable load, the current loading being a current value of the variable load in the absence of the photovoltaic power supply;
   (b) determining an expected peak loading of said variable load for a defined time interval and ascertaining therefrom a load adjustment threshold;
   (c) determining a value for a load adjustment parameter from said photovoltaic power supply output, said current loading and said load adjustment threshold, said load adjustment parameter being defined as said current loading less said photovoltaic power supply output less said load adjustment threshold; and
   (d) controlling said variable load employing said value of said load adjustment parameter to increase the effective capacity of said photovoltaic power supply without operational feedback control of said photovoltaic power supply.

2. The method of claim 1, wherein said determining (a) further comprises determining the current loading of the variable load in the absence of the photovoltaic power supply and in the absence of the controlling (d) of the variable load.

3. The method of claim 1, wherein said determining (b) comprises setting an initial expected peak loading at a start of the defined time interval and reevaluating the expected peak loading within the defined time interval with reference to variations in the variable load, said reevaluating comprising increasing the expected peak loading when the variable load exceeds the expected peak loading, and wherein said reevaluating and increasing comprise:

```
If LOAD > EPL then
    EPL=LOAD
    PPV=PPV₀ · EPL₀/EPL
Else
    No Change
``` wherein:
   LOAD=the variable load=LD+PV+SLCLD;
   LD=measured value of the variable load;
   PV=measured photovoltaic power supply output;
   SLCLD=estimated load change due to said controlling (d)
   $EPL_0$=initial expected peak loading at a start; of the defined time interval;
   EPL=expected peak loading variable;
   $PPV_0$=initial percentage of photovoltaic penetration determined by a ratio of installed photovoltaic capacity and peak of the variable load or a fraction thereof; and
   PPV=current percentage of photovoltaic penetration determined by the ratio of the installed photovoltaic capacity and the peak of the loading or a fraction thereof.

4. The method of claim 3, wherein the measured value of the variable load (LD), the measured photovoltaic power supply output (PV), and the estimated load change due to said controlling (d) (SLCLD) are determined as rolling averages within a defined measurement time interval.

5. The method of claim 1, wherein:
   said controlling (d) comprises adjusting current loading of the variable load if the value of the load adjustment parameter exceeds zero, wherein said adjusting is proportional to the value of the load adjustment parameter;
   said controlling (d) further comprises adjusting an operating threshold of at least one load component of the variable load;

said method further comprises predefining a maximum possible action and wherein said adjusting of said operational threshold comprises adjusting said operational threshold proportional to the value of the load adjustment parameter up to said maximum possible action; and wherein said variable load comprises a temperature load, and said maximum possible action comprises a maximum acceptable level of temperature change.

6. The method of claim 5, wherein said determining (a) further comprises determining the current loading of the variable load in the absence of the photovoltaic power supply and in the absence of the controlling (d) of the variable load, said controlling (d) of the variable load resulting in an estimated load change determined as:

$$SLCLD = PA \cdot KWD$$

wherein:

SLCLD=estimated load change due to said controlling (d)

PA=a current amount of operational threshold adjustment by said adjusting; and

KWD=expected amount of kilowatt load reduction of the variable load resulting from a degree of temperature change.

7. The method of claim 6, further comprising defining two parameters $SLCLD_{long}$ and $SLCLD_{short}$, wherein $SLCLD_{long}$ is a running mean average of $PA \cdot KWD$ over N minutes, where N is a user estimated amount of time necessary for a temperature adjustment to have full impact on the variable load, and $SLCLD_{short}$ is a running mean average of $PA \cdot KWD$ over M minutes, where M is a user defined time interval, and M<N; and wherein:

$$LOAD = LD + PV + \text{Min}(SLCLD_{short}, SLCLD_{long})$$
$$LOAD' = LD + PV + \text{Max}(SLCLD_{short}, SLCLD_{long})$$

where

LOAD=a parameter used to update a value for the expected peak loading determined by said determining (b);

LOAD'=a parameter used to calculate the parameter PA (i.e., a current amount of operational threshold adjustment by said adjusting);

LD=measured value of the variable load

PV=measured photovoltaic power supply output $SLCLD_{short}$=running mean average of $PA \cdot KWD$ over N minutes;

$SLCLD_{long}$=running mean average of $PA \cdot KWD$ over M minutes, where M<N.

8. The method of claim 1, wherein:

said controlling (d) comprises adjusting current loading of the variable load if the value of the load adjustment parameter exceeds zero, wherein the adjusting is proportional to the value of the load adjustment parameter;

said controlling (d) further comprises adjusting an operating threshold of at least one load component of the variable load;

said method further comprises predefining a maximum possible action and wherein said adjusting of said operational threshold comprises adjusting said operational threshold proportional to the value of the load adjustment parameter up to said maximum possible action;

wherein said variable load comprises a temperature load, and said maximum possible action comprises a maximum acceptable level of temperature change; and wherein:

$$PA = \text{Max}(PA_{now}, PA_{old} - MPA/q)$$

where:

PA=a temperature adjustment request;

$PA_{now}$=is a current temperature adjustment request $PA_{old}$=is a previous temperature adjustment request MPA=predefined maximum possible action q=a user selected parameter.

9. The method of claim 1, wherein the variable load comprises a variable cooling temperature load, said controlling (d) further comprises adjusting an operating threshold of at least one load component of the variable load, and wherein when said adjusting results in an increase in cooling temperature, said increase in cooling temperature being accomplished without use of any heating system associated with the variable load.

10. A load controller for controlling a variable load coupled to a power grid and a photovoltaic power supply, said load controller comprising:

(i) means for determining photovoltaic power supply output and current loading of the variable load, said means for determining (i) comprising means for ascertaining a current value of the variable load in the absence of the photovoltaic power supply;

(ii) means for determining an expected peak loading of said variable load for a defined time interval and for ascertaining therefrom a load adjustment threshold;

(iii) means for determining a value for a load adjustment parameter based on said photovoltaic power supply output, said current loading, and said load adjustment threshold, said load adjustment parameter being defined as said current loading less said photovoltaic power supply output less said load adjustment threshold; and (iv) means for controlling said variable load employing said value of said load adjustment parameter to increase the effective capacity of said photovoltaic power supply.

11. The load controller of claim 10, wherein said means for determining (i) further comprises means for determining the current loading of the variable load in the absence of the photovoltaic power supply and in the absence of the means for controlling (iv) the variable load.

12. The load controller of claim 10, wherein said means for determining (ii) comprises means for setting an initial expected peak loading at a start of the predefined time interval and for reevaluating the expected peak loading within the defined time interval with reference to variations in the variable load, said means for reevaluating comprising means for increasing the expected peak loading when the variable load exceeds the expected peak loading, and wherein said means for reevaluating and means for increasing comprise:

```
If LOAD > EPL then
    EPL = LOAD
    PPV=PPV₀ · EPL₀/EPL
Else
    No Change
``` wherein:

LOAD=the variable load=LD+PV+SLCLD;

LD=measured value of the variable load;

PV=measured photovoltaic power supply output;

SLCLD=estimated load change due to said means for controlling (iv);

EPL$_0$=initial expected peak loading at a start of the defined time interval;

PPV$_0$=initial percentage of photovoltaic penetration determined by a ratio of installed photovoltaic capacity and peak of the variable load or a fraction thereof; and PPV=current percentage of photovoltaic penetration determined by the ratio of the installed photovoltaic capacity and the peak of the loading or a fraction thereof.

13. The load controller of claim 12, wherein the measured value of the variable load (LD), the measured photovoltaic power supply output (PV), and the estimated load change due to said means for controlling (iv) (SLCLD) are determined as rolling averages within a predefined measurement time interval.

14. The load controller of claim 10, wherein:

said means for controlling (iv) comprises means for adjusting current loading of the variable load if the value of the load adjustment parameter exceeds zero, wherein said adjusting is proportional to the value of the load adjustment parameter;

said means for controlling (iv) further comprises means for adjusting an operating threshold of at least one load component of the variable load;

said load controller comprises means for predefining a maximum possible action and wherein said means for adjusting said operational threshold comprises means for adjusting said operational threshold proportional to the value of the load adjustment parameter up to said maximum possible action; and wherein said variable load comprises a temperature load, and said maximum possible action comprises a maximum acceptable level of temperature change.

15. The load controller of claim 14, wherein said means for determining (i) further comprises means for determining the current loading of the variable load in the absence of the photovoltaic power supply and in the absence of said means for controlling (iv) the variable load, said means for controlling (d) the variable load resulting in an estimated load change determined as:

$$SLCLD=PA \cdot KWD$$

wherein:

SLCLD=estimated load change due to said means for controlling (iv)

PA=current amount of operational threshold adjustment by said means for adjusting; and KWD=expected amount of kilowatt load reduction of the variable load resulting from a degree of temperature change.

16. The load controller of claim 15, wherein two parameters SLCLD$_{long}$ and SLCLD$_{short}$ are defined, SLCLD$_{long}$ being a running mean average of PA·KWD over N minutes, where N is a user estimated amount of time necessary for a temperature adjustment to have full impact on the variable load, and SLCLD$_{short}$ being a running mean average of PA KWD over M minutes, where M is a user defined time interval, and M<N; and wherein:

$$LOAD=LD+PV+\text{Min}(SLCLD_{short}, SLCLD_{long})$$

$$LOAD'=LD+PV+\text{Max}(SLCLD_{short}, SLCLD_{long})$$

where

LOAD=a parameter used to update a value for the expected peak loading determined by said means for determining (ii);

LOAD'=a parameter used to calculate the parameter PA (i.e., a current amount of operational threshold adjustment by said adjusting);

LD=measured value of the variable load

PV=measured photovoltaic power supply output

SLCLD$_{short}$=running mean average of PA·KWD over N minutes;

SLCLD$_{long}$=running mean average of PA·KWD over M minutes, where M<N.

17. The load controller of claim 10, wherein:

said means for controlling (iv) comprises means for adjusting current loading of the variable load if the value of the load adjustment parameter exceeds zero, wherein the adjusting is proportional to the value of the load adjustment parameter;

said means for controlling (iv) further comprises means for adjusting an operating threshold of at least one load component of the variable load;

said load controller further comprises means for predefining a maximum possible action and wherein said means for adjusting of said operational threshold comprises means for adjusting said operational threshold proportional to the value of the load adjustment parameter up to said maximum possible action;

wherein said variable load comprises a temperature load, and said maximum possible action comprises a maximum acceptable level of temperature change; and wherein:

$$PA=\text{Max}(PA_{now}, PA_{old}-MPA/q)$$

where:

PA=a temperature adjustment request;

PA$_{now}$=is a current temperature adjustment request

PA$_{old}$=is a previous temperature adjustment request

MPA=predefined maximum possible action q=a user selected parameter.

18. The load controller of claim 10, wherein the variable load comprises a variable cooling temperature load, said means for controlling (iv) further comprises means for adjusting an operating threshold of at least one load component of the variable load, and wherein when said means for adjusting results in an increase in cooling temperature, said increase in cooling temperature being accomplished without use of any heating system associated with the variable load.

* * * * *